United States Patent [19]

Hamilton, Jr. et al.

[11] Patent Number: 5,760,556
[45] Date of Patent: Jun. 2, 1998

[54] MOTOR CONTROLLER AND PROTECTOR UNIT

[75] Inventors: James Wallace Hamilton, Jr., Mebane, N.C.; Lisa E. Rosner, East Windsor; Mark J. Obermeier, Coventry, both of Conn.

[73] Assignee: General Electric Company, New York, N.Y.

[21] Appl. No.: 592,191

[22] Filed: Jan. 26, 1996

[51] Int. Cl.⁶ ............................................. H02P 1/00
[52] U.S. Cl. ................................... 318/438; 361/30
[58] Field of Search .......................... 318/729, 438, 318/254, 439, 138, 434, 798, 815, 453, 454, 479; 361/23, 31, 32, 33, 30, 91; 388/504

[56] References Cited

U.S. PATENT DOCUMENTS

| | | | |
|---|---|---|---|
| 4,291,263 | 9/1981 | Stevenson et al. | 318/706 |
| 4,454,462 | 6/1984 | Spann | 318/729 |
| 4,581,568 | 4/1986 | Fitzpatrick et al. | 318/729 |
| 4,628,241 | 12/1986 | Bristow et al. | 318/729 X |
| 4,641,074 | 2/1987 | Hamilton, Jr. et al. | 318/706 |
| 4,683,411 | 7/1987 | Hamilton, Jr. et al. | 318/706 |
| 4,912,390 | 3/1990 | Curran, Jr. et al. | 318/812 |
| 5,077,512 | 12/1991 | Weber | 318/729 X |
| 5,166,592 | 11/1992 | Bashark | 318/799 X |
| 5,200,684 | 4/1993 | Fisher | 318/809 |
| 5,241,256 | 8/1993 | Hatanaka et al. | 318/801 |
| 5,577,890 | 11/1996 | Nielsen et al. | 318/729 X |

*Primary Examiner*—Jonathan Wysocki
*Attorney, Agent, or Firm*—Carl B. Horton; Richard A. Menelly

[57] ABSTRACT

A motor controller unit of the type providing optimum motor operation and protection is configured to determine phase rotation correction during motor start-up without stopping and re-configuring. The effects of heat on the squirrel cage (amortisseur) and motor field windings are accurately and automatically determined on a continuing basis to deter nuisance trip occurrence during motor start and restart operations and to prevent damage to the motor windings during continuous motor operation, respectively.

9 Claims, 9 Drawing Sheets

MOTOR CONTROLLER AND PROTECTOR UNIT

BACKGROUND OF THE INVENTION

Highly efficient motor controller units such as those described within U.S. Pat. No. 4,641,074 entitled "Synchronous Motor Protection" consistently calculate the effective system power factor and adjust the power factor to optimum values under various load conditions.

When such motor controller units are used with synchronous motors employing "squirrel cage" windings, the phase rotation is determined as a final step during electrical installation by momentarily energizing the motor stator and observing the direction of shaft rotation. If the motor shaft is observed to rotate in the wrong direction, the phase rotation and the phase connections are incorrect. At this time, the motor is de-energized and the wire terminal connections are changed to produce correct phase rotation. With proper phase rotation, phase rotation correction is determined by energizing the stator and comparing calculated power factor to actual power factor. If they differ in sign, the motor is de-energized and the operator must negate the phase rotation correction reference. The proper phase rotation correction is essential to insure that the motor protection relay does not respond to interrupt the motor current in view of incorrect overcurrent determination resulting in nuisance tripping.

Another situation that exists with state-of-the-art motor controller units is the use of power factor in identifying asynchronous operation. Under these asynchronous conditions, the measured power factor differs from stored power factor reference. However, it has been determined that the time constant used to calculate optimum power factor may vary for the type of loads to which the associated motor is subjected. For equipment requiring fast response, a short time constant in the order of tens of milliseconds is required. For those applications involving cyclical loading such as with air compressors and the like, longer time constants up to one second may be required in order to properly detect, and protect against damaging pulsations on the motor supply and shaft.

A further problem often encountered with existing motor controller units is the difficulty in determining the effective temperature of the amortisseur, hereinafter "squirrel cage" windings. U.S. Pat. No. 4,291,263 entitled "Amortisseur Winding Protection System" describes the comparison of the motor slip frequency during start-up to predetermined slip frequencies to control the motor speed for protecting the squirrel cage windings during start-up. Restart protection protects the squirrel cage windings. Field Overtemp protection protects the field windings. These are truly two distinct functions.

Restart protection is particularly important when an operating motor is stopped for a short period of time and is restarted before the squirrel cage windings return to room temperature. The associated protective relay may allow the motor to start, but the motor will not be allowed to reach synchronous speed if the additional heating effects exceed the allowed temperature for the squirrel cage windings. These aborted starts result in unnecessary down-time and delay. U.S. Pat. No. 4,683,411 entitled "Synchronous Motor Protection" describes control of the motor thermal characteristic by use of manually entered reference values.

A further problem encountered with existing motor controller units is the necessary monitoring of the temperature of the field windings to prevent damage while the motor is running under synchronous conditions. The effective resistance of the field winding is compared to the resistance of the winding at room temperature and to an acceptable rise in resistance. If the field windings overheat, current to the motor will be removed to prevent damage to the windings.

One purpose of the invention is to improve over the art of motor controller units by eliminating the aforementioned problems dealing with nuisance tripping during motor start-up and re-start. Another purpose is to prevent potential thermal damage to the squirrel cage windings and field windings. An additional purpose is to provide optimum operating power factor over a wide range of load conditions without incurring increased expense.

SUMMARY OF THE INVENTION

A motor controller unit provides automatic determination of the true motor phase rotation correction during start-up and corrects the phase indication to LAGGING if otherwise indicated. To prevent nuisance trip occurrence during a motor restart operation, a calculation is continually undertaken to determine the real-time effects of temperature upon the motor windings and to project what the effects of temperature of the squirrel cage will be when the motor reaches synchronous speed. Restart is inhibited if the projected squirrel cage temperature would be damaging. To prevent damage to the field windings when the motor is running with the field applied, the resistance of the field windings is monitored and compared to a stored resistance reference value. Power factor calculations are made on a continuing basis and adjustments are provided automatically to insure optimum power factor operation at all times.

BRIEF DESCRIPTION OF THE DRAWINGS

FIG. I is a circuit diagram of the electrical components used with the motor controller unit according to the invention.

DESCRIPTION OF THE PREFERRED EMBODIMENT

Figure 1:
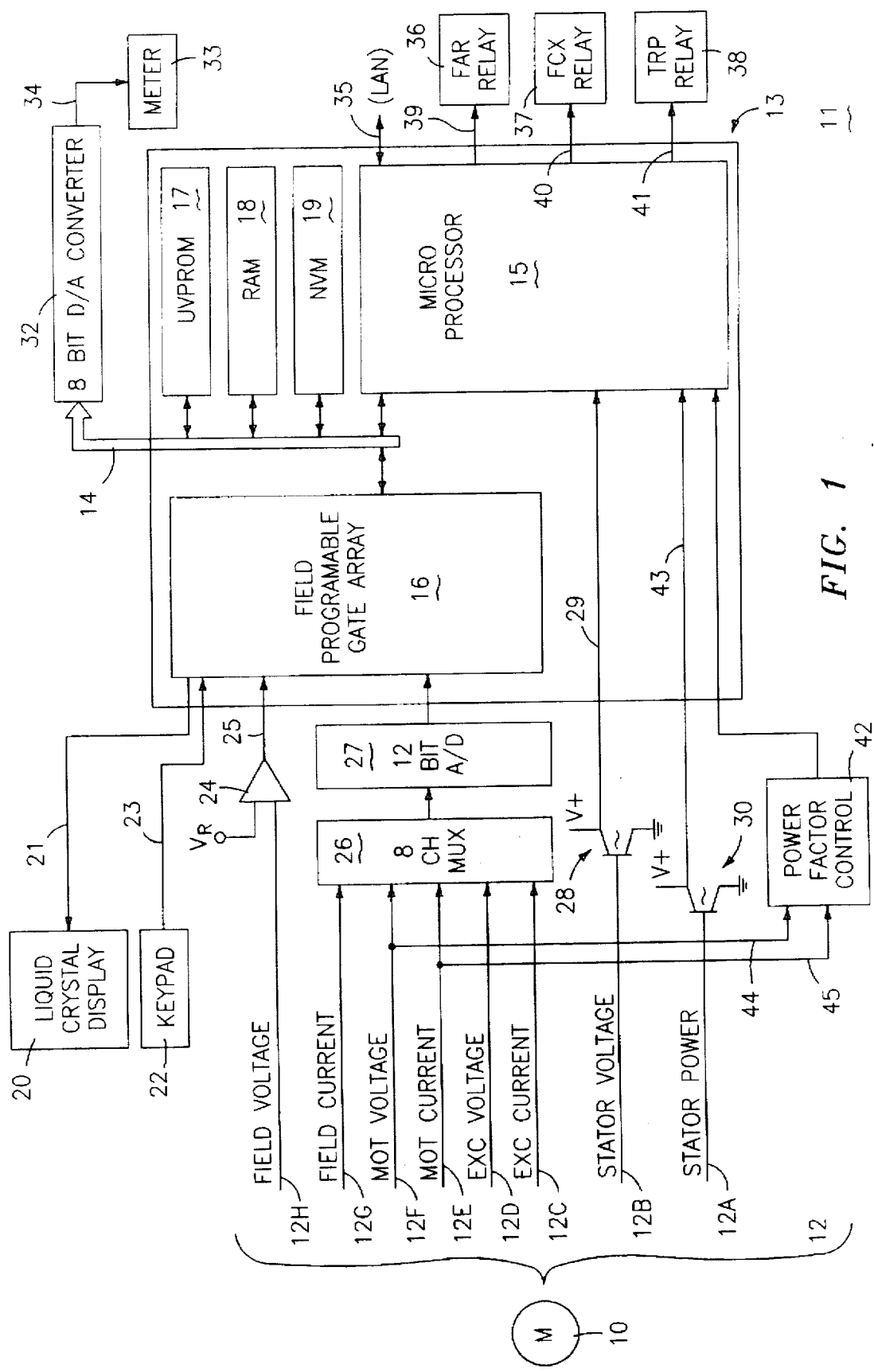

The motor controller unit 11 shown in FIG. 1 is similar to that described within the aforementioned U.S. Pat. No. 4,641,074 entitled "Synchronous Motor Protection" and includes a central processor unit (CPU) 13 to contain the electronic components such as the internal data bus 14, field programmable gate array (FPGA) 16, UVPROM 17, RAM 18, NVM 19 and microprocessor 15. The controlled motor 10 connects with the CPU by means of a multi-connector cable 12 wherein conductors 12C–12G connect with the FPGA through an 8-channel multiplexer 26 and 12 bit A/D converter 27. Conductor 12A connects with the FPGA through a comparator 24 and conductor 25. Conductors 12A, 12B connect with the microprocessor 15 through a pair of opto-isolators consisting of a first photo-transistor 28 and a second photo-transistor 30 and a pair of conductors 29, 31 connecting between the cathodes of the phototransistors and the inputs to the microprocessor. A separate power factor control circuit 42 connects with the motorcurrent and voltage inputs over separate conductors 44,45 to provide input to the microprocessor over conductor 43 to coordinate the circuit logic with the actual phase rotation state of the motor during start-up in the manner to be described below in greater detail. Each of the electronic components on the CPU communicate internally over the internal bus 14 and with the associated meter 33 through a D/A converter 32 and conductor 34. The microprocessor 15 controls the associated relays 36–38 by means of signals transmitted from the outputs from the microprocessor over conductors 39–41. The keypad 22 connects with the FPGA over conductor 23 and allows an operator to input and extract data from the FPGA as well as to display such data on the display 20 over conductor 21. The microprocessor 15 communicates with the LAN over a separate communications bus 35, as indicated.

POWER FACTOR PHASE ROTATION

Figure 2:
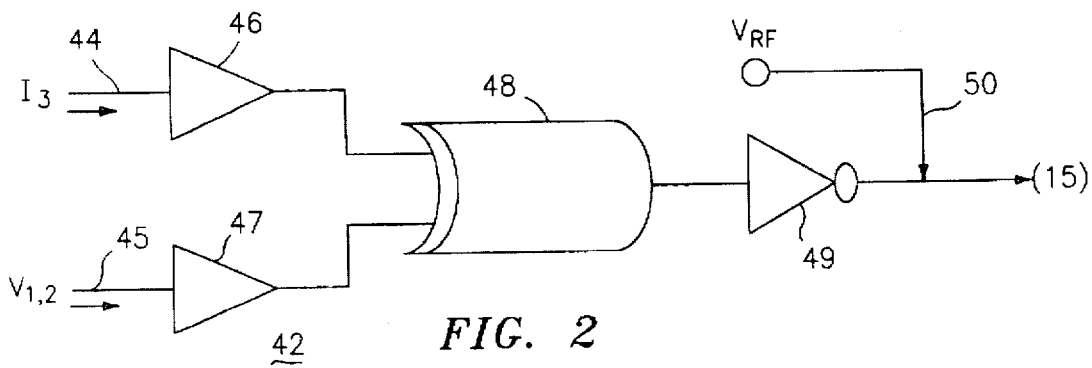
FIG. 2 is a diagrammatic representation of the circuit components within the Power Factor Control circuit of FIG. 1.

The power control circuit 42 is shown in FIG. 2 to consist of a pair of operational amplifiers 46, 47 that receive circuit current over conductor 44 and circuit voltage over conductor 45 for inputting to an EXCLUSIVE-OR gate 48. The phase currents and voltages are examined immediately upon start-up to insure that the current is lagging rather than leading the voltage. The output of the EXCLUSIVE-OR gate is input to an OR gate 49 for comparison to a reference provided to the output of the OR gate over conductor 50 and the results are input to the microprocessor for evaluation. If the phase of the current is leading the voltage during start-up, the microprocessor adjusts the logic applied to the various voltage and current inputs accordingly. Since the current always lags the voltage during motor start-up, the microprocessor adjustment eliminates the requirement that the motor be de-energized and the phase rotation correction reference be re-programmed as is the practice to date. In the event that an operator should inadvertently connect the improper phase connections at a later time, the improper phase rotation is inputted to the microprocessor and indication thereof is displayed on the display 20. Upon motor re-start, the adjustment is again made to the microprocessor to insure proper phase rotation during operation of the microprocessor on real time current and voltage values. Each time the motor is started, the microprocessor determines the phase rotation correction from real-time current and voltage values while the motor is operating in induction mode, thus eliminating the need for user intervention in defining a phase rotation correction reference.

Figure 3:
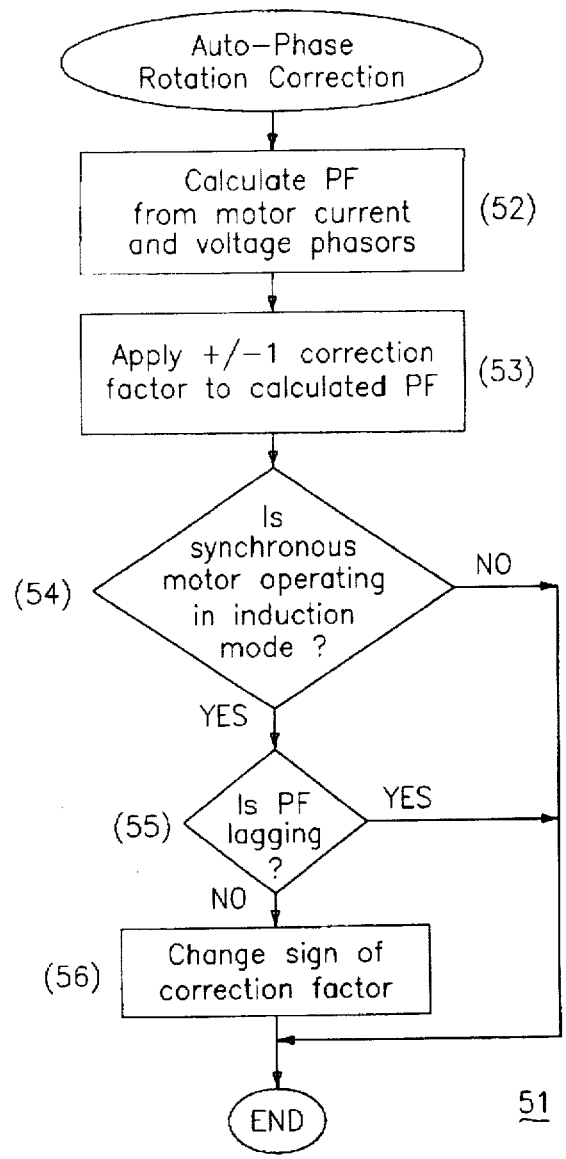
FIG. 3 is a flow chart representation of the phase rotation function according to the invention.

The method of providing phase rotation correction is best seen by referring to the Auto-Phase Rotation Correction flow chart 51 shown in FIG. 3. The motor current and voltage phasers are first calculated (52) and a plus or minus correction factor is made to the calculated power factor value (53). A determination is made as to whether the synchronous motor is operating in an induction mode (54) and if not, no further determinations are required. If the motor is operating in an induction mode, a determination is then made as to whether the power factor is lagging (55) and if so, no further determinations are required. If the power factor is not lagging, the sign of the correction factor is changed accordingly (56).

SQUIRREL CAGE PROTECTION

The motor controller and protector unit of the invention accepts both so-called "brushless" as well as "ring type" motors which have different operating programs to accomplish the benefits of the invention. Both the brushless and ring type motors have rotor-mounted field poles which must have DC supplied to their windings so that the rotor poles can lock onto the rotating stator field and run in synchronism. They both also have amortisseur, also called "squirrel cage" windings built into the tips of the rotor poles to provide acceleration and damping torques during starting and normal operation. During start-up, the motor accelerates to near synchronous speed. When the rotor is close enough to synchronous speed for the field poles to pull the rotor into synchronism, DC is applied to the main field and the rotor then pulls into step, and normally operates at some power factor equal to or more leading than unity.

Unlike the collector ring-type, the brushless motor has no brushes or slip rings. Instead, it contains a rotating exciter with stator mounted DC windings and the armature winding on the rotor. A rotor-mounted, solid-state rectifier converts the AC from the exciter to DC for the main-field poles. The control circuitry are rotor-mounted, along with the field discharge resistor, to control the application of DC to the main field at proper rotor speed and angle. In "ring-type" motors, the frequency of the induced field voltage occurring at the input to the photo-transistor 24 from the conductor 12H in FIG. 1 is continuously monitored to determine the actual motor speed at any given instant in time. An equivalent incremental amount of time is accumulated for each motor speed as calculated from characteristic curves derived from allowable stall time, running time at 50 percent speed and the system frequency in hertz. The protection is initiated upon motor start-up and continues until the FAR relay 36 is activated by the microprocessor 15 to preclude nuisance tripping of the motor 10 by external voltage ripple factors. Upon motor start-up, the equivalent times for the various motor speeds are accumulated every 100 milliseconds and are incremented in a restart protection register within the microprocessor for comparison to a maximum accumulated threshold value. If the threshold accumulate value is exceeded before the FAR relay 36 is activated, the circuit current to the motor is interrupted by operation of the TRP relay 38.

Figure 4:
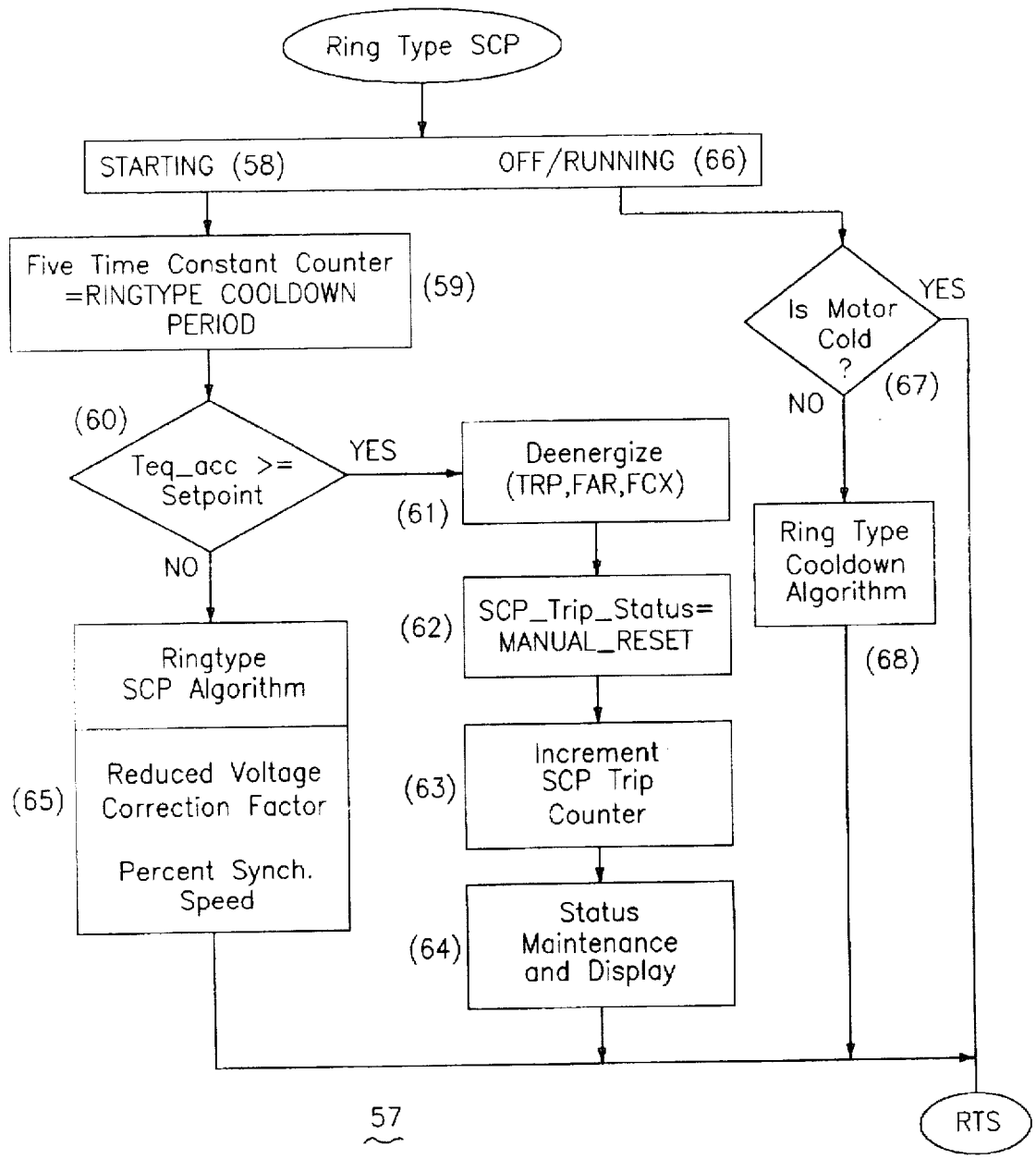
FIG. 4 is a flow chart representation of the squirrel cage protection function for a ring type motor.

The method of squirrel cage protection (SCP) for a ring type motor is best seen by referring to the ring type SCP protection process (57) depicted in FIG. 4.

The ring type STARTING protection process (58) sets the counter in the microprocessor 15 of FIG. 1 equal to a predetermined ring type cooldown period (59) and determines whether the accumulated equivalent time exceeds a predetermined setpoint stall time (60), and if so, the trip relay 38 of FIG. 1 is actuated (61). The trip status is set at manual reset (62), the trip counter in the microprocessor is incremented (63), and the status on the display 30 is indicated (64). If the accumulated equivalent time is less than the setpoint stall time, the ring type SCP algorithm described above is started, using the predetermined reduced voltage correction factor and the percent of synchronous speed at which the motor is currently operating (65).

Figure 6:
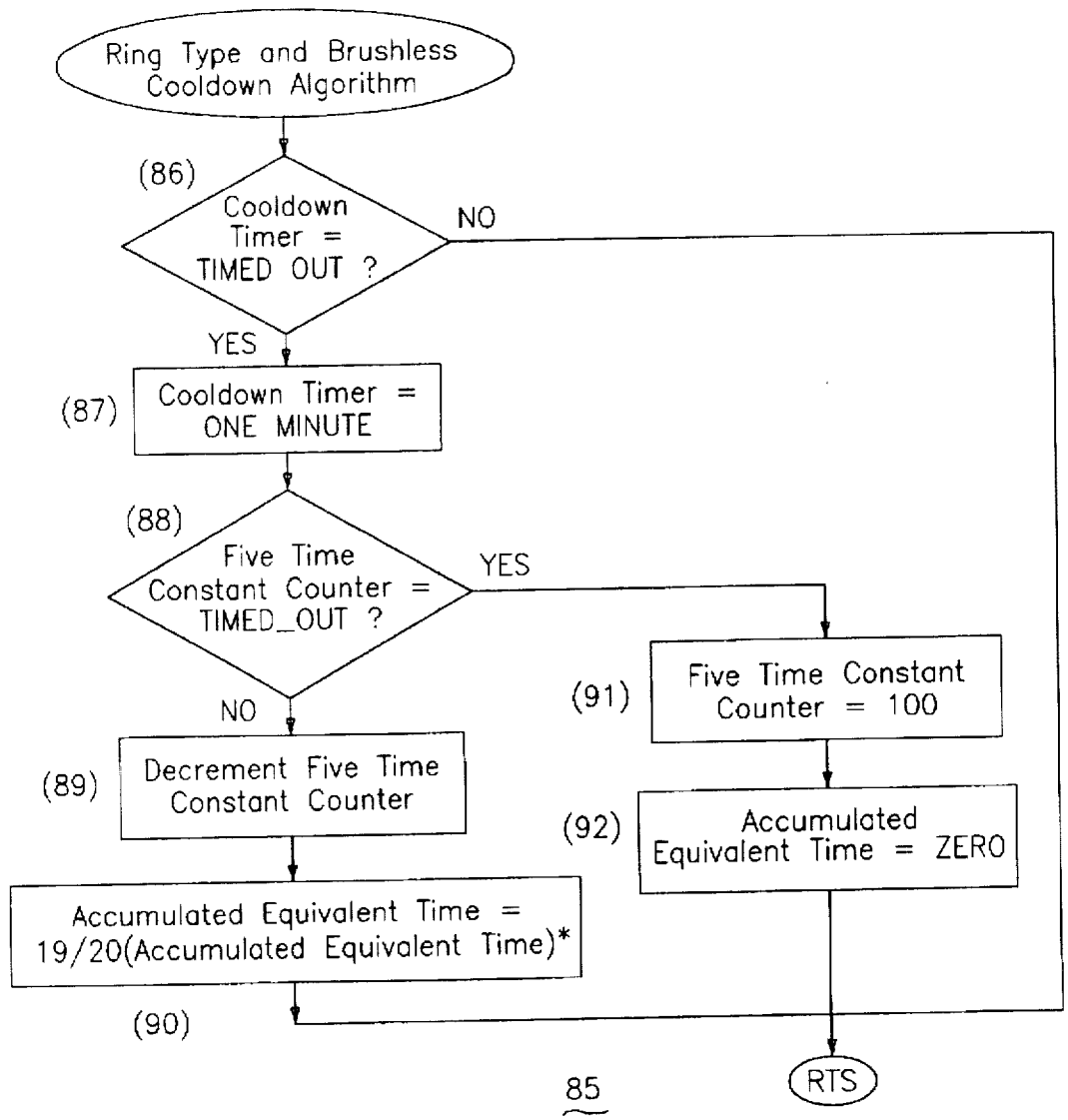
FIG. 6 is a flow chart representation of the squirrel cage cooldown algorithm for both a ring type and a brushless motor.

The ring type OFF and RUNNING protection process (66) determines whether the motor is cool (67) and if so, the determination is repeated. If the motor is not cool, the cooldown algorithm shown in FIG. 6 is implemented (68) and the determination is made again after completion of the ring type cooldown algorithm.

Figure 5:
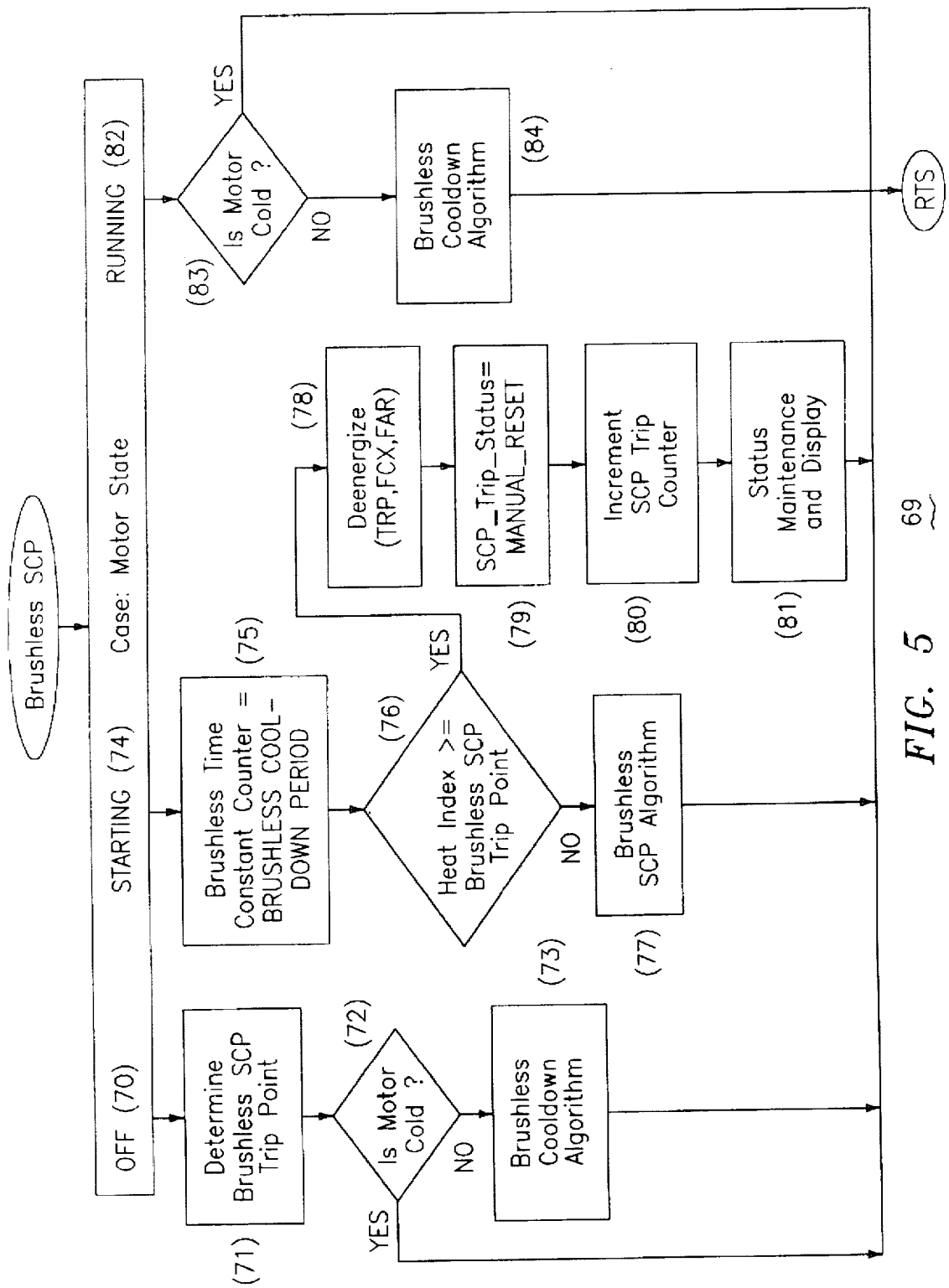
FIG. 5 a flow chart representation of the squirrel cage protection function for a brushless motor.

The method of squirrel cage protection (SCP) for a brushless motor uses an $I^2t$ function, and is best seen by referring to the brushless SCP flow chart (69) depicted in FIG. 5. Since the SCP is provided at all states of motor activity, several flow charts are required.

The brushless OFF state protection process (70) first determines a trip point (71) and then determines whether the motor is cool (72), i.e., room temperature, and if so returns to the start position. If the motor is not cool, the cooldown algorithm depicted in FIG. 6 is applied (73).

The brushless STARTING state protection process (74) is next applied and the brushless time constant counter in the microprocessor 15 of FIG. 1 is set to the brushless cooldown period (75). A determination is made as to whether the heat index is greater than a predetermined SCP set point (76) and a SCP algorithm is applied (77). The SCP algorithm is similar to that described within the aforementioned U.S. Pat. No. 4,641,074 entitled "Synchronous Motor Protection". If the heat index exceeds the SCP trip point, the trip relay 38 of FIG. 1 is actuated (78), the trip status is set to manual reset (79), the trip counter in the microprocessor 15 of FIG. 1 is then incremented (80), and indicated (81) on the display 20 of FIG. 1.

The brushless RUNNING protection process (82) determines whether the motor is cool (83) and if not, the cooldown algorithm depicted in FIG. 6 is applied (84).

The cooldown algorithm for both a ring type and brushless motor is depicted at 85 in FIG. 6 wherein a determination is made as to whether the cooldown timer in the microprocessor has timed out (86) and if not, the process is continuously repeated. If so, the cooldown timer is set equal to one minute (87) and a determination is made as to whether the five time constant counter in the microprocessor has timed out (88). If not, the five time constant counter is decremented (89) and the accumulated equivalent time is set equal to 19/20 times the accumulated equivalent time (90). If the five time constant counter has timed out, the five time constant counter is set equal to 100 (91), the accumulated equivalent time is set equal to zero (92) and the process is repeated.

RESTART PROTECTION

To prevent the motor from being restarted when the sum of the accumulated times stored in the restart registers within the microprocessor 15 of FIG. 1 and the projected incremental time that would be accumulated in addition to this amount if the motor were to complete the start sequence, are in excess of the setpoint values, the TRP relay 38 is de-energized, the cooldown wait time is calculated and is displayed within the display 20. Should an attempt be made to restart the motor during this time period, the TRP relay prevents motor turn-on. After the TRP relay is first de-energized, the restart register in the microprocessor is decremented every 20 minutes to 37% of its value at the time the TRP relay was energized. When sufficient time has elapsed to allow the sum of the accumulated time value and the projected additional time for a complete start to become less than the setpoint plus a margin of safety, the TRP relay is reset and the "READY" indication is displayed in the display 20.

Figure 7:
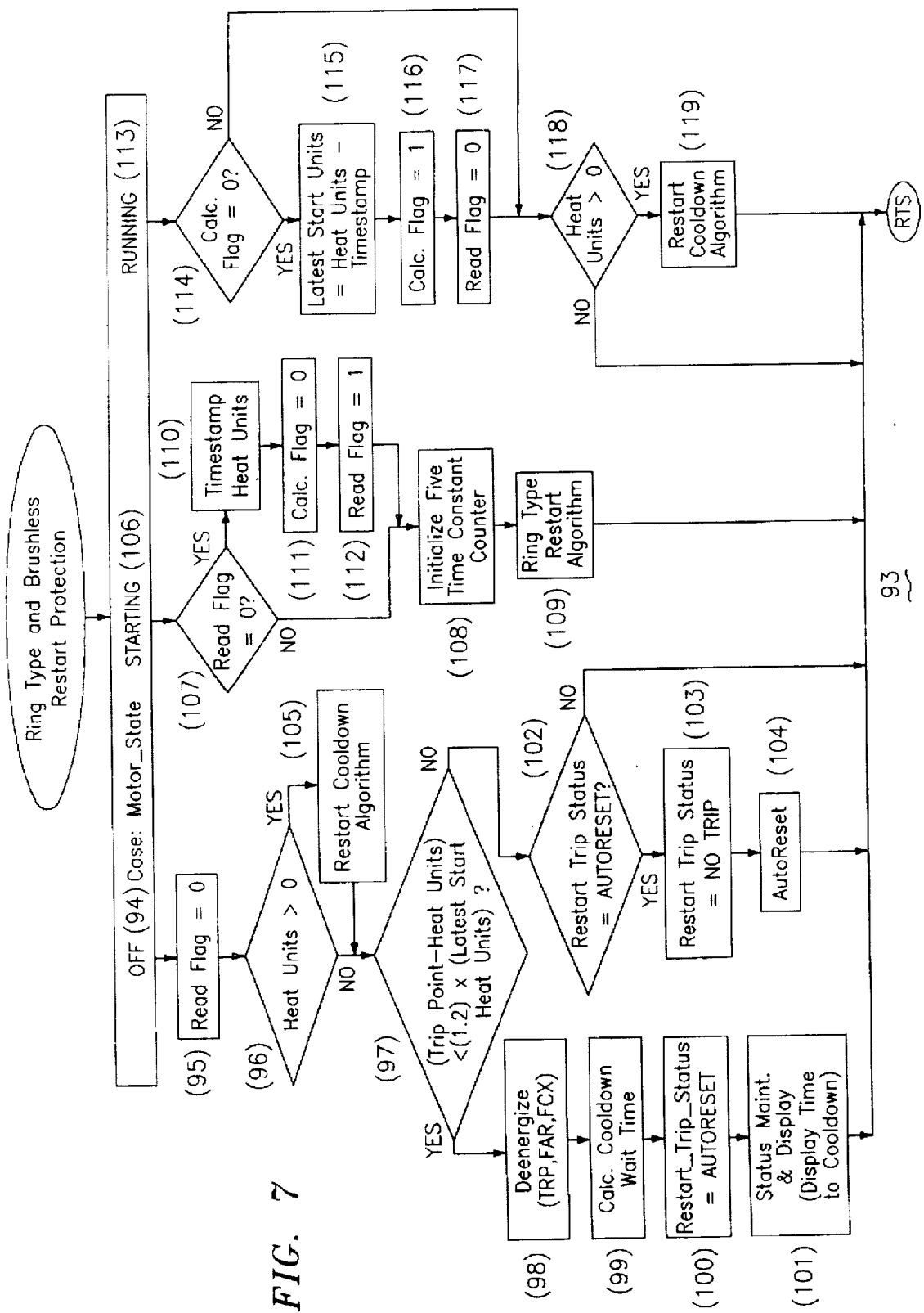
FIG. 7 is a flow chart representation of the restart protection function for both a ring type and a brushless motor.
Figure 8:
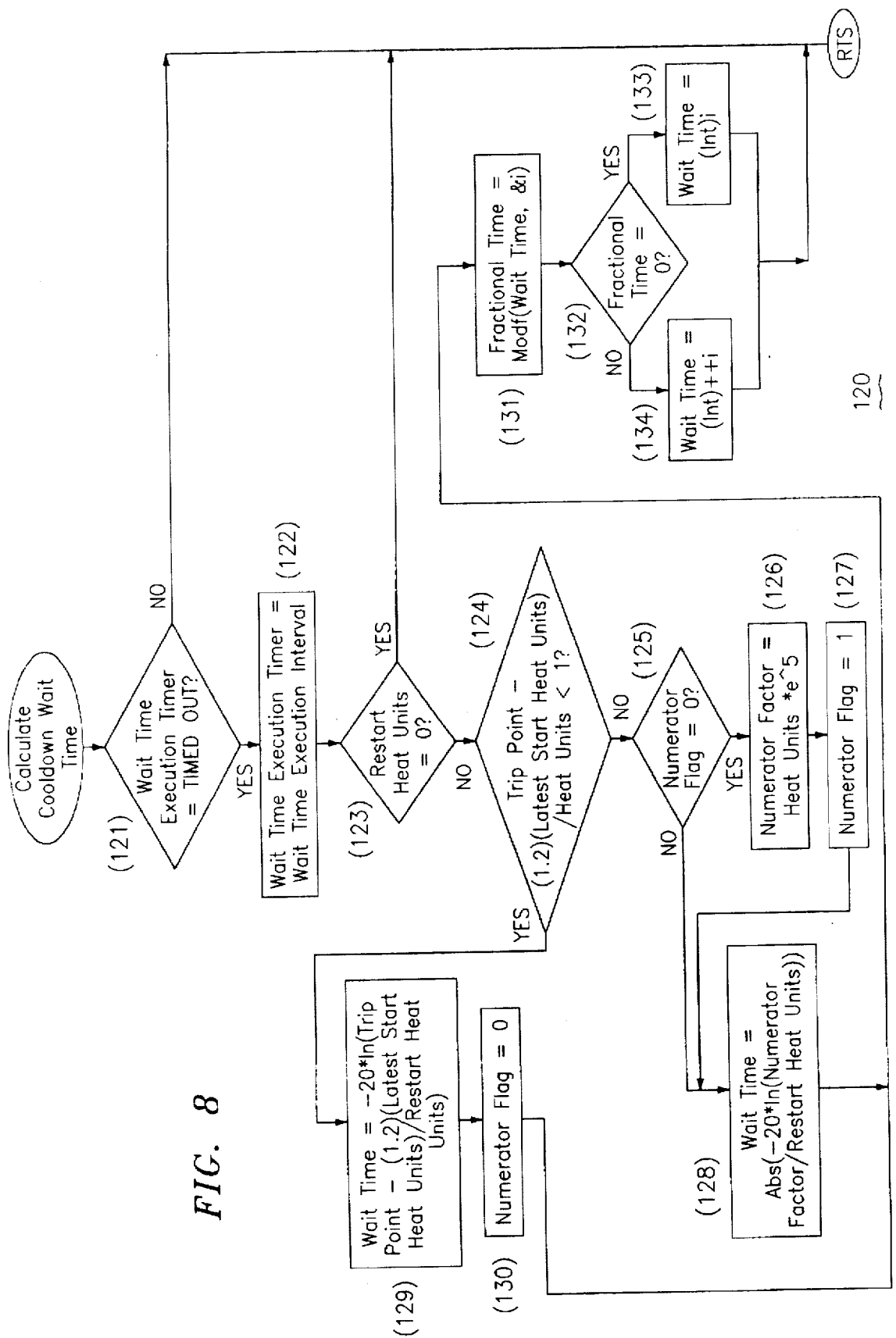
FIG. 8 is a flow chart representation of the cooldown wait time calculation for both a ring type and a brushless motor.

The protection processes for providing restart protection for the ring type and brushless motor are depicted at 93 in FIG. 7. The OFF state protection process (94) is initiated by setting the read flag in the microprocessor 15 of FIG. 1 equal to zero (95) and determining whether the motor heat units are greater than zero (96). If not, a determination is made as to whether the difference between the predetermined trip point and the heat units is less than one and two tenths times the predetermined latest start heat units (97). If so, the FAR, FCX and TRP relays 36-38 of FIG. 1 are actuated (98), the cooldown wait time algorithm shown in FIG. 8 is applied (99), the restart trip status is set to AUTORESET(100) and the cooldown wait time is indicated (101) on the display 20. If the difference between the stored trip point and the heat units is not less than one and two tenths times the predetermined latest start heat units a determination is made as to whether the restart trip status is at AUTORESET (102), if so, the restart trip status is set to NO TRIP (103) and an autoreset function is initiated (104). If the restart trip status is not set to AUTORESET, the process is repeated. If the motor heat units are greater than zero, the cooldown algorithm is restarted (105) and steps (97)-(104) are undertaken.

The STARTING protection process (106) is initiated by determining whether the read flag is equal to zero (107) and if not, the five time constant counter in the microprocessor 15 of FIG. 1 is initialized (108) and the restart algorithm described within the aforementioned U.S. Pat. No. 4,641, 074 is initiated (109). Otherwise, if the read flag is zero, the current value of the heat units is stored (110), the calculation flag is set to zero (111), the read flag is set to one (112), and steps (108), (109) are undertaken.

The RUNNING protection process (113) is initiated by determining whether the calculation flag in the microprocessor 15 of FIG. 1 is equal to zero (114) and if so, the latest start units are set equal to the difference between the current value of the heat units and the value for heat units which was stored in STARTING mode (115), the calculation flag is set equal to one and the read flag is set equal to zero (116), (117). A determination is made as to whether the heat units are greater than zero (118) and, if not, the process is repeated. If the heat units are greater than zero, the restart cooldown algorithm described in the aforementioned U.S. patent is initiated (119) and the process is repeated. If the calculation flag is not equal to zero, only steps (118), (119) are implemented.

The cooldown wait time algorithm for restart protection in a ring type and brushless motor is depicted at (120) in FIG. 8 wherein a determination is made as to whether the wait time execution timer in the microprocessor has timed out (121) and if not, the process is continuously repeated. If so, the wait time execution timer is set equal to the wait time execution interval (122) and a determination is made as to whether the brushless restart heat units equal zero (123) If so, the process is continuously repeated. If not, a determination is made as to whether the quotient of the difference between the predetermined trip point and one and two tenths times the latest start heat units and the current value of heat units is less than unity (124). If not, a determination is made as to whether the numerator flag is equal to zero (125), and if so, the numerator factor is set equal to the product of the heat units and "e" raised to the fifth power (126). The numerator factor flag is then set equal to one (127). The wait time is calculated by taking the absolute value of negative twenty times the natural logarithm of the numerator factor divided by the current value of restart heat units (128). This step is performed if the numerator factor flag is not equal to zero, or if the numerator factor flag is equal to zero as earlier indicated. If the trip point minus one and two tenths times the latest start heat units divided by the current value of heat units is less than unity, then wait time is calculated as negative twenty times the natural logarithm of the trip point minus one and two tenths times the latest start heat units divided by the current value of restart heat units (129) and the numerator flag is set to zero (130). The fractional portion of cooldown wait time is calculated (131), and a determination is made as to whether the fractional portion of the cooldown wait time is equal to zero (132), and if so, the cooldown wait time is the whole number portion of the previously determined cooldown wait time (133). If not, the cooldown wait time is set equal to the whole number portion of the previously determined cooldown wait time after it has been incremented (134). This value is then used to output the cooldown wait time to the display 20, as described earlier with the Restart Protection Process shown in FIG. 7.

FIELD WINDING OVER TEMPERATURE PROTECTION

The exciter current and exciter voltage on conductors 12D and 12E in FIG. 1 are used to determine the resistance of the field winding and hence the temperature within the motor 10. Thermal calculations are derived from the resistance of the field winding by dividing the exciter voltage values by the field current values within the microprocessor. By comparing the calculated resistance values with the reference value in ohms comparable to 25 degrees C., overheating of the field winding can be effectively prevented by removing the field if safe temperatures are exceeded. The calculations are made each second to provide real time resistance calculations and the motor current is interrupted in the event the calculated resistance value exceeds the setpoint resistance. For example, given a field resistance at 25 C. of 2 ohms and copper field winding insulation of class B, the trip setting for field ohms should correspond to a winding temperature of 135 C., which is approximately 142 percent of the field ohms as given at 25 C. Using these guidelines, the user will set the microprocessor to trip at 1.42 times two ohms, which is 2.84 ohms.

Figure 9:
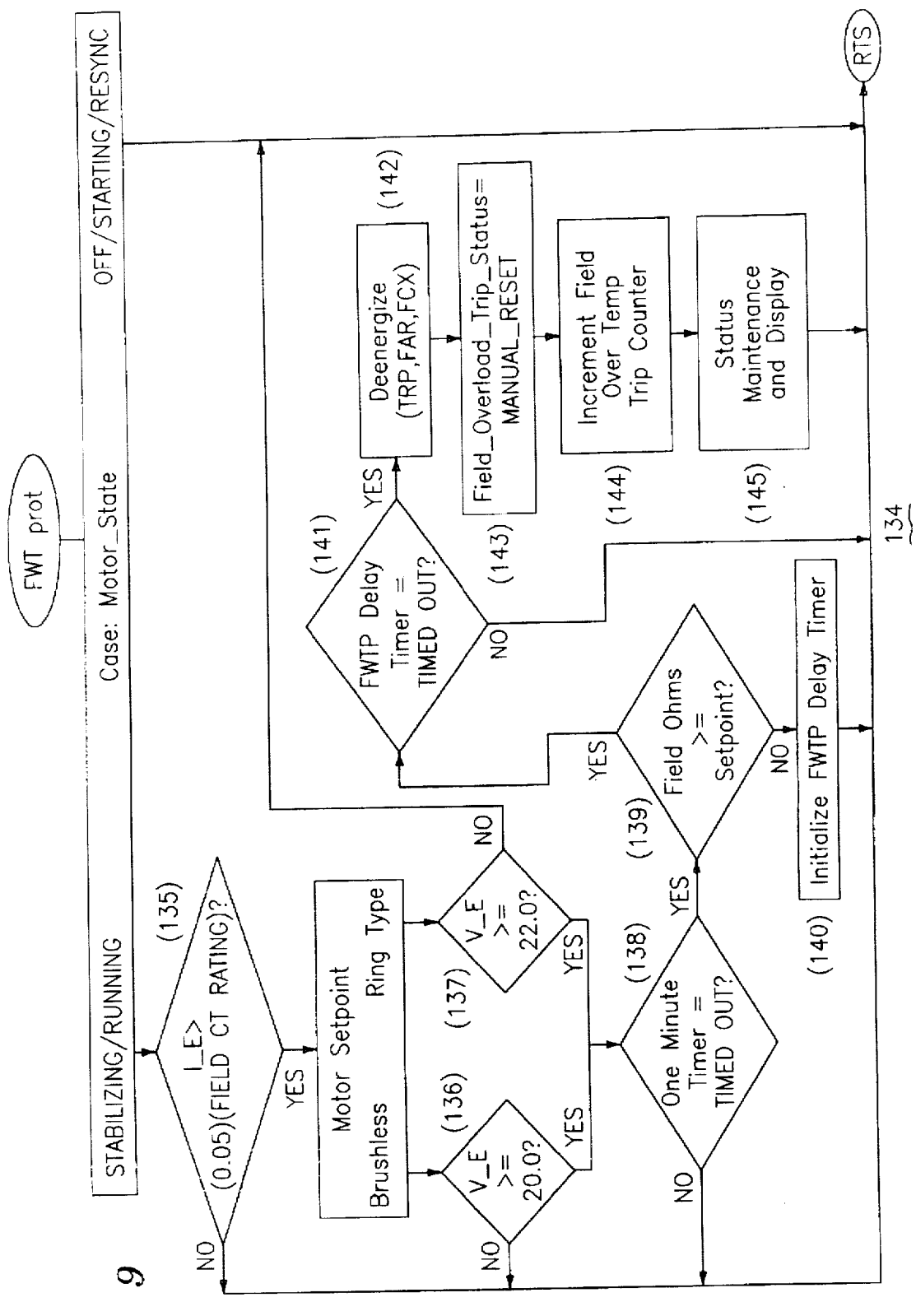
FIG. 9 is a flow chart representation of the field winding over temperature protection function.

The field winding thermal protection flow charts for both brushless and ring type motors are depicted at 134 in FIG. 9. The protection process is initiated by determining whether the exciter current is greater than five percent of the stored field current transformer rating (135) and if not, the process is continuously repeated. If the exciter current is greater than five percent of the stored field current transformer rating and the motor is brushless, a determination is made as to whether the exciter voltage is greater than or equal to 20 volts (136). If the motor is ring-type, a determination is made as to whether the exciter voltage is greater than or equal to 22 volts (137). If not, the process is continuously repeated, and if so, a determination is made if the one minute timer in the microprocessor 15 of FIG. 1 has timed out (138). If not, the process is continuously repeated. If so, a determination is made as to whether the calculated resistance in ohms exceeds a stored set point (139) and if not, the field winding thermal overtemperature delay timer in the microprocessor is initiated (140) and the process is repeated. If so, a determination is made as to whether the field winding thermal overtemperature delay timer has timed out (141) and if not, the process is repeated. If so, the TRP, FCX and TRP relays 36–38 of FIG. 1 are actuated (142) and the field overload trip status is set to MANUAL RESET (143), the field overload trip counter within the microprocessor is incremented (144) and the status is indicated (145) on the display 20 of FIG. 1, and the process is repeated.

RIDE-THRU POWER FACTOR PROTECTION

The ride-thru power factor function provides protection against damaging cyclical loads by maintaining an accumulator over a predetermined amount of time. The accumulator is not cleared until the predetermined amount of time has elapsed without any further dips in power factor. Each time the power factor dips below the setpoint, a timer increments. When the accumulated time exceeds the setpoint allowable time, a power factor trip is initiated. However, if the predetermined amount of time passes, without any excursions below the power factor setpoint, then the timer is cleared.

Figure 10:
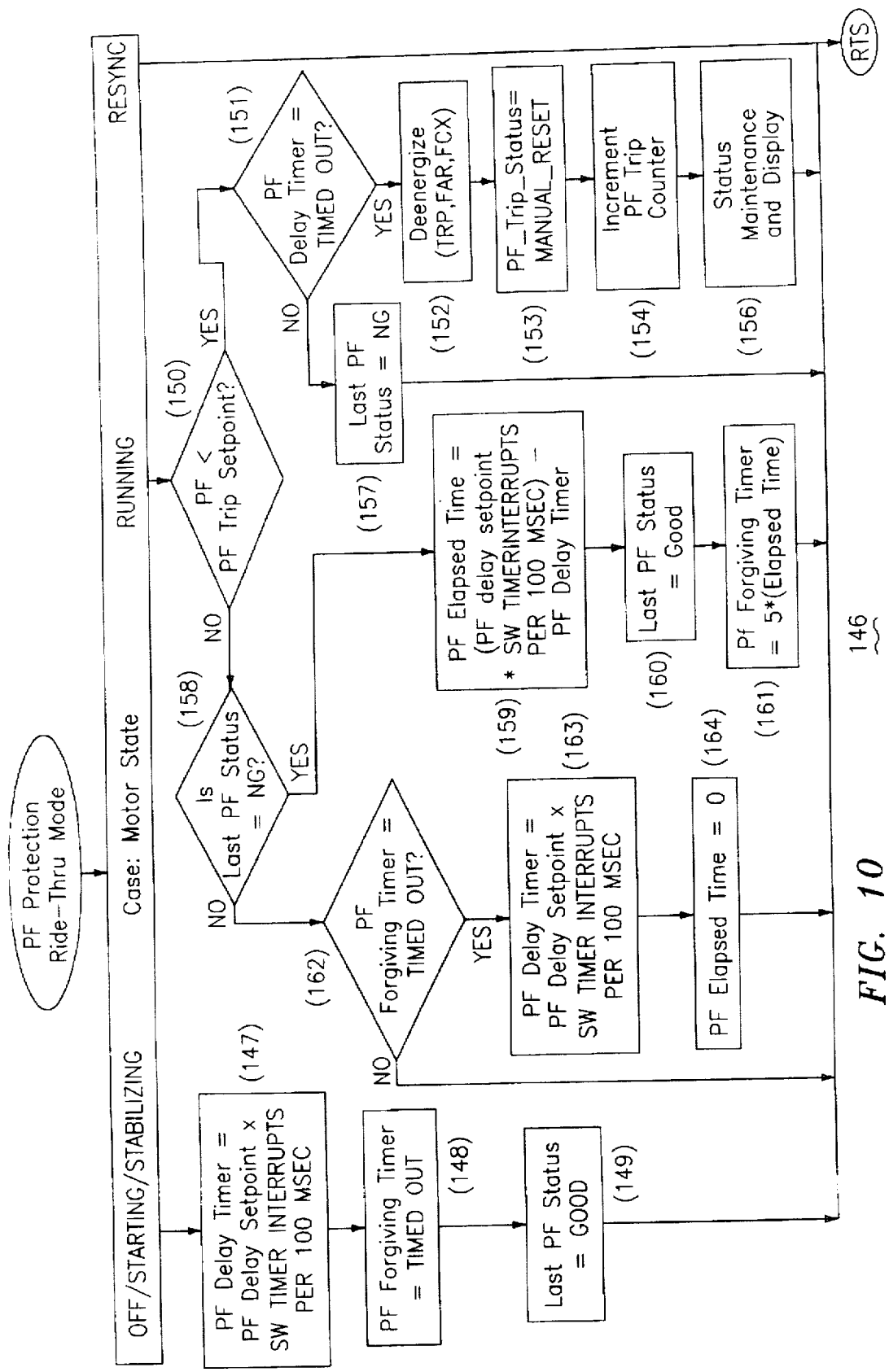
FIG. 10 is a flow chart representation of the power factor ride-thru mode protection.

The power factor protection program is depicted at 146 in FIG. 10. When the motor is OFF or STARTING, the power factor delay timer is set to the power factor delay setpoint (147), the power factor forgiving timer is set to zero (148), and the last power factor status is set to GOOD (149). When the motor is RUNNING, the determination is made as to whether the power factor is less than the setpoint (150), and if so, the determination is made as to whether the power factor delay timer has timed out (151). If the power factor delay timer is timed out, then the TRP, FAR and FCX relays 36–38 of FIG. 1 are actuated (152), and the power factor trip status is set to MANUAL RESET (153), the power factor trip counter is incremented (154), and the status is displayed on the display 20 of FIG. 1 (156). The process is then repeated. If the power factor delay timer is not timed out, then the last power factor status is set to NO GOOD (157), and the process is repeated. If the power factor is greater than the power factor trip setpoint, then the determination is made as to whether the last power factor status was NO GOOD (158), and if so, then the power factor elapsed time is calculated as the difference between the power factor delay setpoint and the current value of the power factor delay timer (159). The last power factor status is set to GOOD (160), and the power factor forgiving timer is set to five times the predetermined elapsed time (161). The process is then repeated. If the last power factor status was GOOD, then the determination is made as to whether the power factor forgiving timer is timed out (162), and if so, the power factor delay timer is set to the power factor delay setpoint (163) and the power factor elapsed time is set equal to zero (164)

We claim:

1. A motor controller unit comprising:

a central processor circuit arranged for connecting between an associated synchronous electric motor and a plurality of electronic relays, said central processor circuit further includes an internal communications bus, said electronic relays being arranged to prevent motor start and to interrupt motor current upon command;

entry means connecting with said processor circuit for inputting data and commands to said processor circuit;

display means connecting with said processor circuit for information display in response to said input commands;

a power factor control circuit arranged for connecting with said synchronous electric motor and with said processor circuit for determining the phase relationship between motor current and voltage and calculating motor power factor based on the above-mentioned phase relationship;

means controlling said processor circuit for insuring phase orientation during calculations governing operation of said electric motor; and, means for examining motor current and voltage immediately upon start-up to insure that the motor current is lagging the motor voltage.

2. The motor controller unit of claim 1 wherein said processor circuit includes a field programmable gate array.

3. The motor controller unit of claim 2 wherein said motor connects with said field programmable gate array through a multiplexer and an A/D converter for providing voltage and current data to said field programmable gate array.

4. The motor controller unit of claim 1 including a microprocessor connecting with said internal bus and said electronic relays.

5. The motor controller unit of claim 4 wherein said processor circuit includes a RAM and NVM communicating with said microprocessor through said internal communications bus.

6. The motor controller unit of claim 4 including a pair of opto-isolators connecting with said motor and said microprocessor for providing motor stator input data to said microprocessor.

7. The motor controller unit of claim 4 wherein said power factor control circuit comprises:

a pair of operational amplifiers arranged for connecting with said electric motor;

an EXCLUSIVE/OR gate connecting with outputs from said operational amplifier; and an INVERTER connecting an output from said EXCLUSIVE/OR gate with said microprocessor.

8. The motor controller unit of claim 7 including reference means connecting with said INVERTER providing phase rotation reference values for combining with an output value received at said INVERTER output for insuring correct motor phase orientation input data to said microprocessor.

9. The motor controller unit of claim 1 wherein said examining means comprises an EXCLUSIVE-OR gate having an output connected to an OR gate for comparison to a reference provided to the output of the OR gate.

* * * * *